(No Model.) 11 Sheets—Sheet 1.

J. W. RAMSDEN & H. S. ELLIS.
SEWING MACHINE.

No. 465,887. Patented Dec. 29, 1891.

Fig. 1

Witnesses.
Thos. E. Craven. Fel. Inst. P.A.
William Sadler.

Inventors
John William Ramsden
Harry Senior Ellis.

(No Model.) 11 Sheets—Sheet 2.

J. W. RAMSDEN & H. S. ELLIS.
SEWING MACHINE.

No. 465,887. Patented Dec. 29, 1891.

Fig. 2.

Witnesses
Thos. E. Craven. Fel. Inst. P.A.
William Sadler.

Inventors
John William Ramsden
Harry Senior Ellis.

(No Model.) 11 Sheets—Sheet 3.
J. W. RAMSDEN & H. S. ELLIS.
SEWING MACHINE.

No. 465,887. Patented Dec. 29, 1891.

Witnesses
Thos. E. Craven. Fel. Inst. P.A.
William Sadler.

Inventors.
John William Ramsden
Harry Senior Ellis.

(No Model.) 11 Sheets—Sheet 4.

J. W. RAMSDEN & H. S. ELLIS.
SEWING MACHINE.

No. 465,887. Patented Dec. 29, 1891.

Fig. 5.

Witnesses.
Thos. E. Craven, Fel. Inst. P.A.
William Sadler.

Inventors
John William Ramsden
Harry Senior Ellis.

(No Model.) 11 Sheets—Sheet 5.

J. W. RAMSDEN & H. S. ELLIS.
SEWING MACHINE.

No. 465,887. Patented Dec. 29, 1891.

Witnesses.
Thos. E. Craven. Fel. Inst. P.A.
William Sadler.

Inventors.
John William Ramsden
Harry Senior Ellis.

(No Model.) 11 Sheets—Sheet 6.

J. W. RAMSDEN & H. S. ELLIS.
SEWING MACHINE.

No. 465,887. Patented Dec. 29, 1891.

Fig. 9.

(No Model.) 11 Sheets—Sheet 7.

J. W. RAMSDEN & H. S. ELLIS.
SEWING MACHINE.

No. 465,887. Patented Dec. 29, 1891.

Witnesses
Thos. E. Craven. Fel. Inst. P.A.
William Sadler.

Inventors.
John William Ramsden
Harry Senior Ellis.

(No Model.) 11 Sheets—Sheet 10.

J. W. RAMSDEN & H. S. ELLIS.
SEWING MACHINE.

No. 465,887. Patented Dec. 29, 1891.

Fig. 16.

(No Model.) 11 Sheets—Sheet 11.

J. W. RAMSDEN & H. S. ELLIS.
SEWING MACHINE.

No. 465,887. Patented Dec. 29, 1891.

Witnesses
Thos. E. Craven. Fel, Inst. P.A.

William Sadler.

Inventors
John William Ramsden
Harry Senior Ellis.

United States Patent Office.

JOHN WILLIAM RAMSDEN AND HARRY SENIOR ELLIS, OF LEEDS, ENGLAND.

SEWING-MACHINE.

SPECIFICATION forming part of Letters Patent No. 465,887, dated December 29, 1891.

Application filed March 29, 1890. Serial No. 345,896. (No model.)

*To all whom it may concern:*

Be it known that we, JOHN WILLIAM RAMSDEN and HARRY SENIOR ELLIS, engineers, subjects of the Queen of Great Britain and Ireland, residing at Leeds, in the county of York, Kingdom of Great Britain and Ireland, have invented new and useful Improvements in Sewing-Machines, of which the following is a specification.

This invention relates to further improvements in sewing-machines of the kind described in the specification of an application for Letters Patent filed by us, dated February 20, 1890, Serial No. 341,157, and designed for stitching a sole to a welted boot or shoe while the same is on a last.

The present invention has for one of its objects to provide means for preventing the injury to the under or looper thread heretofore usually due to the thread being caused to slide over the hook of the needle during the backward stroke of the needle and while the same is drawing a loop of the thread through the material being sewed, which operation takes place when the thread is in a comparatively tight state. For this purpose we employ, in combination with a hooked needle, a looper and a stitch-tightening device, a device consisting of a reciprocating hook arranged beneath the stitching-cap and in close proximity to the needle when the same extends through the said cap. The arrangement is such that after the needle has passed through the material to be sewed and has received the looper-thread from the looper, the reciprocating hook will first engage the thread and then by a backward or sidewise movement will draw a sufficient length of thread from the stitch-tightening device to form about one-half of the loop to be subsequently formed by the backward movement of the needle, such length of thread being supplied by movement of the stitch-tightening device toward the needle. The hook, by a quick forward movement will release the thread just before or just as the needle commences to return, and while the needle is returning the stitch-tightening device will complete the thread-feeding movement and supply sufficient thread to form the other side of the loop. By this arrangement the needle will draw both sides of the loop through the material simultaneously, thereby preventing the thread sliding over the needle-hook.

In the annexed illustrative drawings, similar letters and numerals refer to like parts in all the views.

Figs. 5 to 18, inclusive, show, to an enlarged scale, various details of the machine, Fig. 5 being a vertical section, partly in side elevation, Fig. 6 a plan, Fig. 7 a front view of Fig. 5, and Fig. 8 a plan, of certain parts of the machine hereinafter described. Figs. 13, 14, and 15, and also

The piercing and feeding of the material are effected in the manner described in the specification of our said former application hereinbefore referred to.

$a^2$ is a dividing and stripper plate; $b$, a curvilinear shuttle-race; $c$, a shuttle; $c^2$, the locking-thread; $e'$, a stitch-tightening lever; $f'$, a shuttle-driver, and $f$ a lever for actuating the same.

$g$ is a stitching-cap, $h$ the material to be sewed, $i$ a curved piercer, L a last whereon the boot or shoe under treatment is placed, $u$ the curved sewing-needle, $w$ the sewing-thread, and $z$ a looper, all arranged and operated in the manner fully described in our said former specification.

$z'$ is the reciprocating hook, (hereinafter called a "pulling-in" hook,) for the purpose hereinbefore mentioned.

Figure 1:
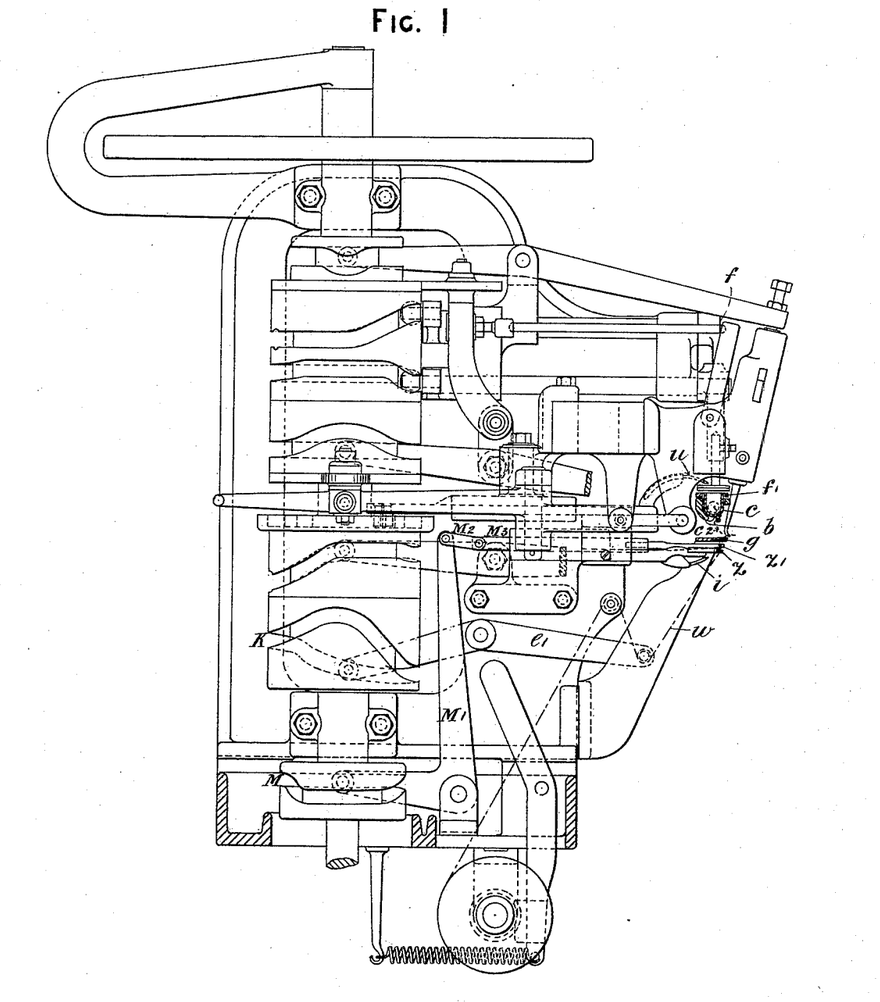
Figure 1 is a side elevation, Fig. 2 a front elevation, and Fig. 3 a partial plan, of a sewing-machine embodying our invention.
Figure 2:
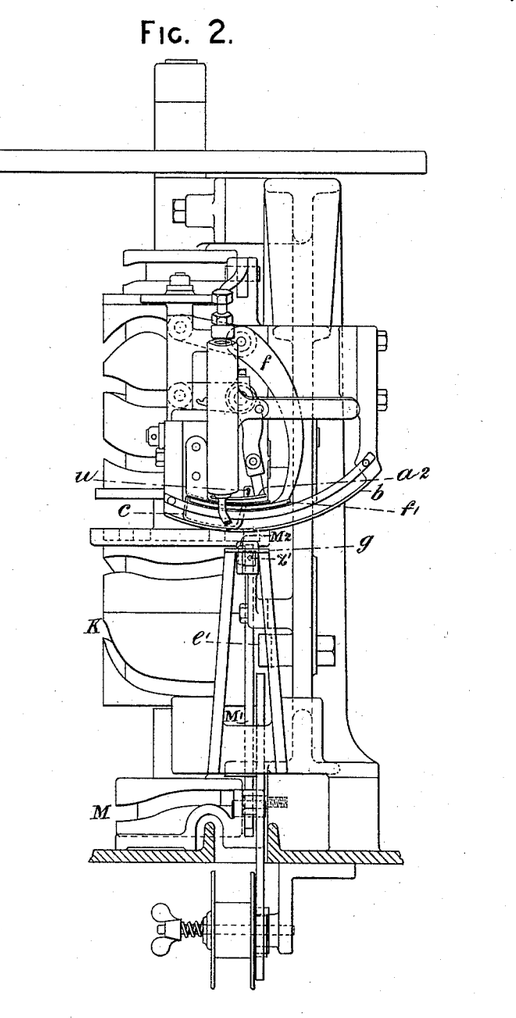
Figure 3:
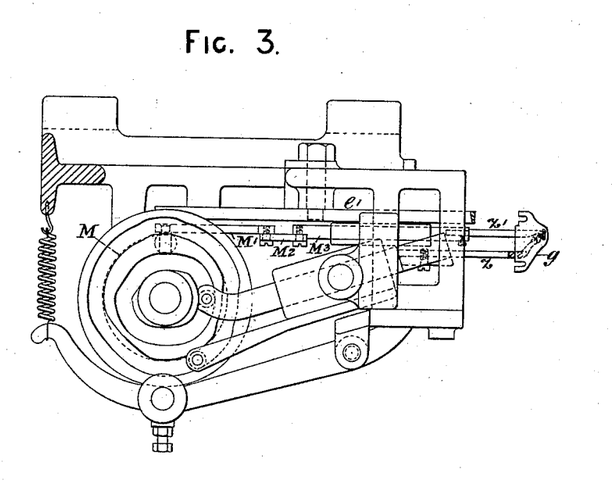
Figure 4:
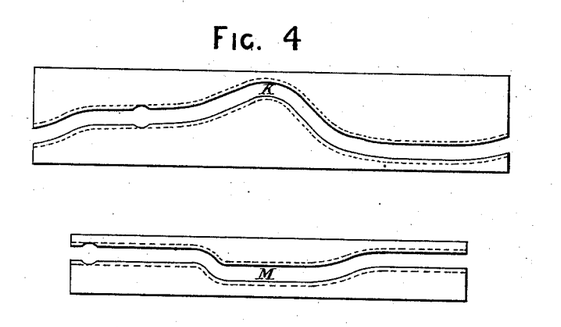
Fig. 4 is a development of the cams for effecting the movements of the lever of the stitch-tightening device and the hook for pulling in the looper-thread after the same has been placed by the looper in the hook of the needle.
Figure 5:
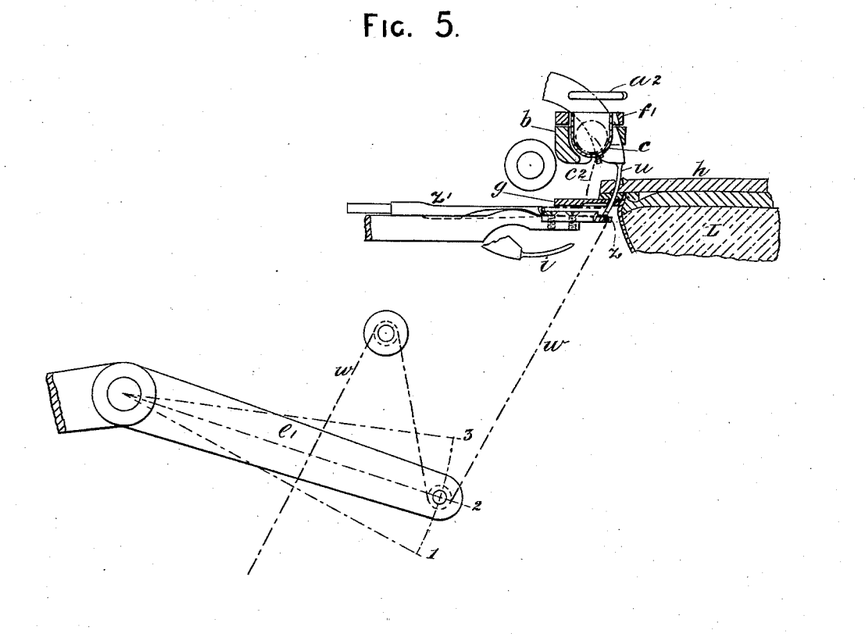
Figure 6:
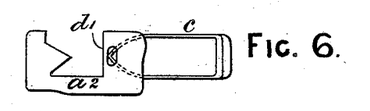
Figure 7:
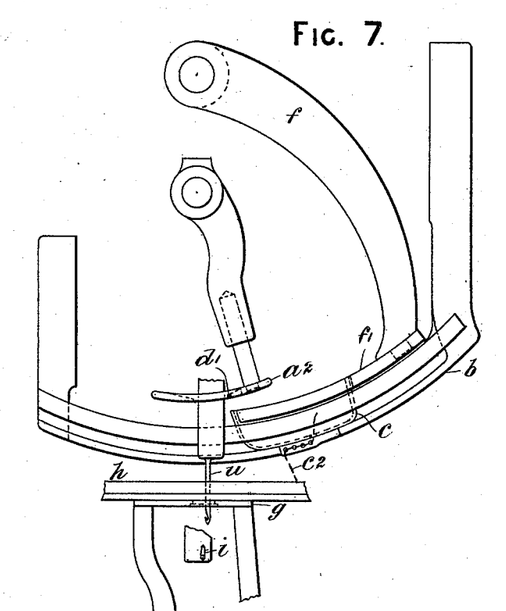

In Fig. 5 the needle $u$ is shown passed through the material, and the looper $z$ as having placed the looper-thread into its hook. The puller-in hook $z'$ at this time is in close proximity to the needle $u$, as shown in Fig.

Figure 8:
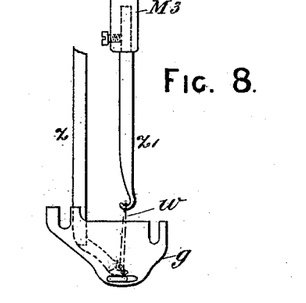

12, but is immediately afterward moved into its backward position, as shown in Figs. 5 and 8, so as to draw a length of the looper-thread $w$ with it sufficient to form one side of a loop. While the hook $z'$ is moving into its backward position, the tightening-lever $e'$ is caused by the cam K to move from the position 1 to the position 2, Fig. 13, toward the needle and supply a length of thread equal to that drawn in by the said puller-in hook $z'$. Just as the needle commences to return the puller-in hook $z'$ is moved into its forward position by the cam M, bell-crank lever M', link $M^2$, and sliding rod $M^3$, this movement being effected somewhat quickly, so that the hook $z'$ frees itself from the length of thread which is previously pulled in. As the needle $u$ makes its backward movement, (see Fig. 9), the stitch-tightening lever $e'$ is caused by its cam K to move in unison with the needle until it attains its highest position 3. By this means both sides of the loop of thread will be free to be drawn through the material $h$ at the same time and speed by the needle during its backward movement, thereby preventing any frictional movement of the looper-thread over the needle-hook. The end of the thread is held by hand or otherwise during the formation of the first stitch.

Figure 9:
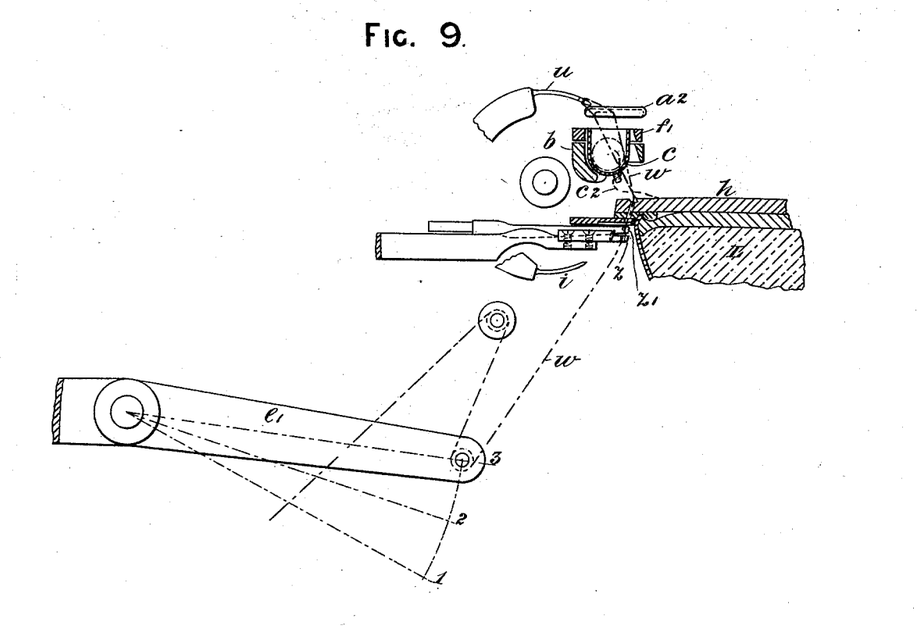
Figs. 9, 10, 11, and 12 are similar views to Figs. 5, 6, 7, and 8, respectively, but with the various parts in a different position.

Fig. 9 shows the needle $u$ in its backward or uppermost position, the pulling-in hook $z'$ in its forward position, and the tightening-lever $e'$ in its highest position 3.

Figure 10:
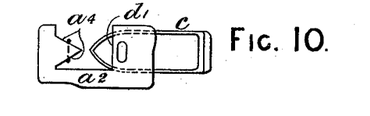
Figure 11:
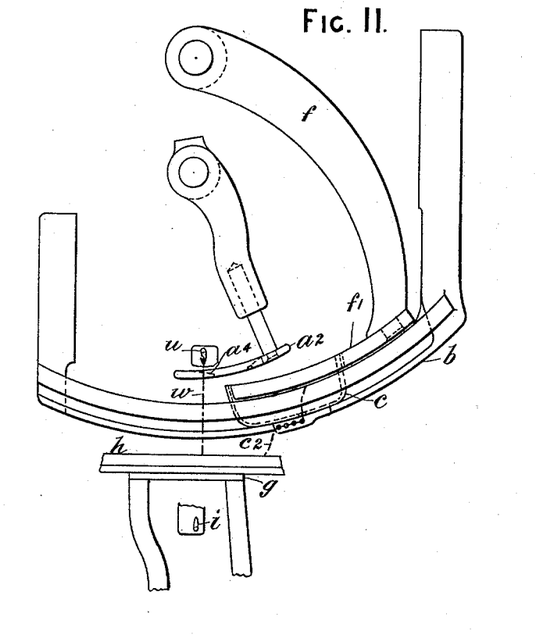

In Figs. 10 and 11 the dividing and stripping plate $a^2$ is shown in its advanced position, in which its inclined sides $a^4$ will have opened the two sides of the loop ready for the shuttle $c$ to pass through it.

Figure 12:
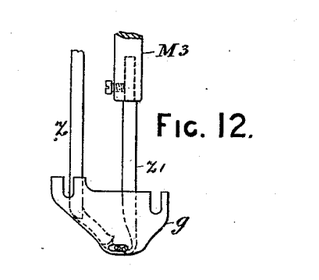

In Fig. 12 the pulling-in hook $z'$ is shown in its forward position ready to again engage the thread after it has been laid into the hook of the needle $u$ by the looper $z$.

Figure 13:
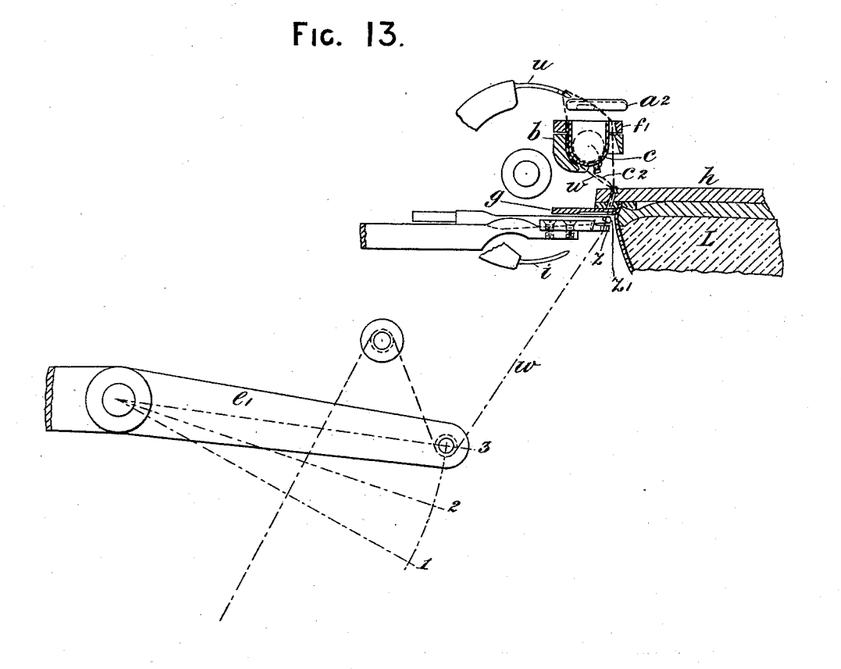
Figure 14:
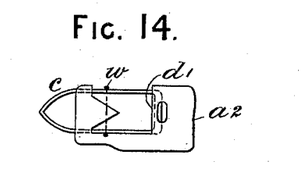
Figure 15:
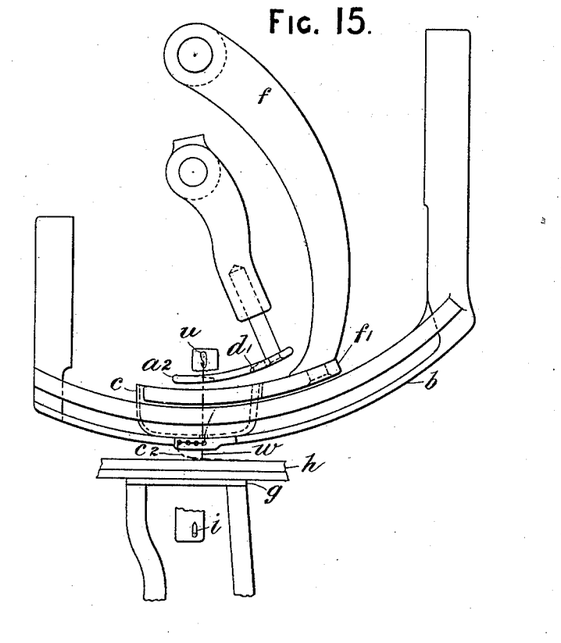

Figs. 13, 14, and 15 show the same parts as in Figs. 9, 10, and 11, but with the shuttle $c$ advanced partly through the loop of thread $w$, the needle at this time being stationary.

Figure 16:
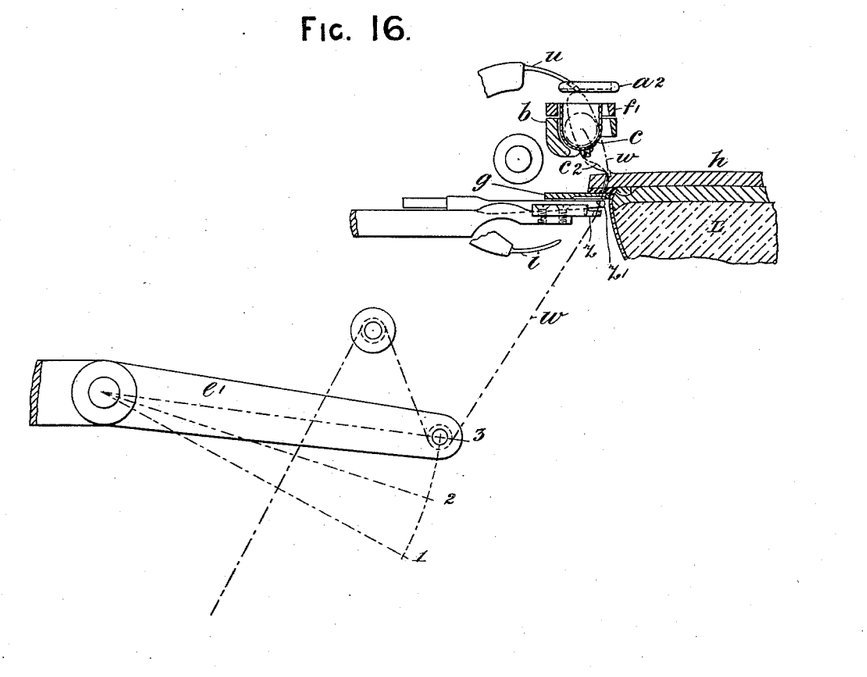
Figs. 16, 17, and 18 are similar views to Figs. 5, 6, and 7, but with the parts in other positions. These figures show various parts of the machine hereinafter described.
Figure 17:
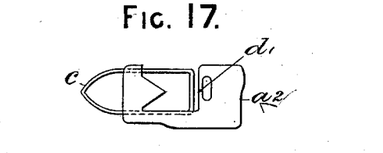
Figure 18:
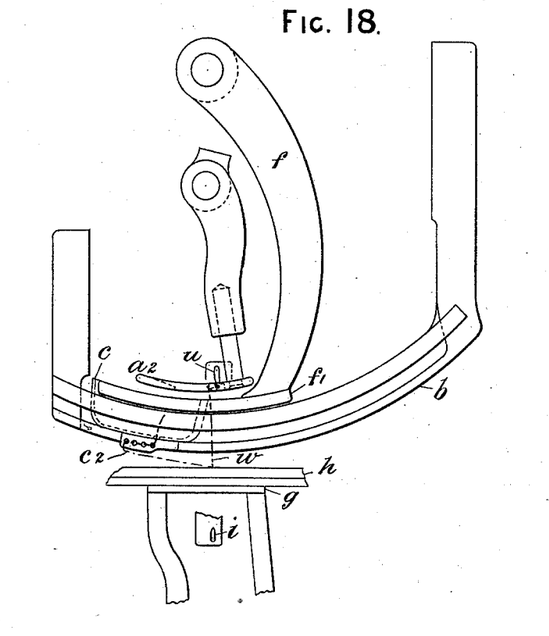

Figs. 16, 17, and 18 show the shuttle advanced through the loop, so as to place the locking-thread $c^2$ from its spool into the loop of thread $w$. The dividing and stripping plate $a^2$ will by this time have moved into its backward position and presented its stripping-bar $d'$, so that on the needle $u$ making a slight advance or dip the loop will be stripped from the needle-hook. Then by the action of the cam K the lever $e'$ of the stitch-tightening device is moved to its lowest position 1 and simultaneously draws the two threads together within the material $h$ and completes the stitch. The tension on the upper or spool thread $c^2$ is applied in the usual way. The hereinbefore-described cycle of operation is repeated for each stitch formed.

As will be obvious, a pulling-in hook according to our invention can be used in sewing-machines in which a straight needle is used instead of a curved one.

We do not herein claim the combination, in a sewing-machine, of a work-support, a curved hooked needle located above the said work-support, a looper having a sliding and oscillating movement to place the thread into the hook of the needle, a curved piercer, and a curvilinear shuttle-race, and a circularly-moving shuttle, said shuttle-race being located within the path of movement of the curved needle and piercer and at right angles to the plane of movement of said needle and piercer and above the work-support. Nor do we claim herein a work-support, a curved piercer, a curved needle, a looper to supply it with thread, a curvilinear shuttle-race located at right angles to the plane of movement of said needle and piercer and open at its under side for the passage of the shuttle-thread from the shuttle, and a circularly-moving shuttle combined with a plate open at the side adjacent to and to permit the passage of the needle, whereby a needle with a small curve and short radius may be used and having a point, and a stripping-bar having a straight stripping side, whereby the point of the stripping-plate is enabled to take the loop of needle-thread and open the same for the passage of the shuttle through it, the stripper-bar thereafter stripping the loop from the hook of the needle. Nor do we claim herein the combination of a curved hooked needle, means to actuate it, a pivoted fulcrum-block having an extension provided with a pin or projection and having a guideway, and a slide-bar fitted in said guideway and provided at one end with a looper and at its other end with a pin or projection, combined with a cam-disk having two cam-surfaces to act on the said pins or projections and vibrate the block and reciprocate the looper-carrying bar longitudinally therein, as such constructions are made the subject-matter of application, Serial No. 341,157, filed by us February 20, 1890, and such subject-matter is claimed therein.

What we claim is—

1. In a lock-stitch sewing-machine, the combination of a vibrating hooked needle, a looper to engage the sewing-thread with the needle-hook, a work-support, a shuttle arranged to reciprocate above said work-support, a stitch-tightening device, a horizontally-reciprocating pulling-in hook $z'$, arranged below said work-support to act upon the thread at a point between the work-support and stitch-tightening device, and means for actuating said stitch-tightening device and pulling-in hook after the thread has been engaged with the needle-hook, whereby the stitch-tightening device is first moved toward the needle to supply a length of thread sufficient to form one-half of the loop to be formed by the needle, and simultaneously therewith the pulling-in hook is moved to engage and draw in this length of thread, and then the pulling-in hook is reciprocated to disengage the thread by a forward movement toward the needle, the stitch-tightening device being moved thereafter toward and in unison with the backward movement of the needle to supply a further length of thread sufficient to form the other half of the loop, substantially as herein described, for the purpose specified.

2. In a lock-stitch sewing-machine, the combination of a vibrating hooked needle, a looper to engage the sewing-thread with the hook of the needle, a work-support, a shuttle arranged to reciprocate in a vertical plane above said work-support and across the path of said needle, a stitch-tightening device, and means for actuating the same to supply thread in the manner set forth, a reciprocating pulling-in hook $z'$, arranged to work horizontally below said work-support, the cam M, bell-crank lever M', link $M^2$, and sliding rod $M^3$ for actuating the same, whereby the hook is first moved forward adjacent to the needle to engage and draw in by its backward movement a length of the thread on the needle sufficient to form one-half of the loop to be formed by the needle, and then releases the thread by a forward movement quicker than the upward movement of the needle, substantially as herein described, for the purpose set forth.

3. In a lock-stitch sewing-machine, the combination, with a vibrating hooked needle, a looper to engage the sewing-thread with the needle-hook, a shuttle arranged to work above the work-support and across the path of said needle, of a pulling-in hook $z'$, arranged to reciprocate below the work-support, and means for actuating said hook, whereby it first acts to engage and draw in a length of thread, and then to release this thread, a stitch-tightening lever $e'$, and means for actuating the same, whereby its forward movement toward the needle to supply thread is made in two stages, to first move in unison with and to supply a length of thread equal to one-half of the loop to be formed to said pulling-in hook in its backward movement, and thereafter to move forward in unison with and to supply thread to said needle in its backward movement until said lever reaches its highest position, substantially as herein described, for the purpose specified.

JOHN WILLIAM RAMSDEN.
HARRY SENIOR ELLIS.

In presence of—
THOS. E. CRAVEN,
*Fel. Inst. P. A.,* 24 *Victoria Chamber, Leeds.*
WILLIAM SADLER,
*Leeds.*